United States Patent [19]

Wiebe, Jr. et al.

[11] Patent Number: 4,781,109

[45] Date of Patent: Nov. 1, 1988

[54] APPARATUS FOR HEATING AND DISPLAYING FOOD PRODUCTS ON A STICK

[75] Inventors: William R. Wiebe, Jr., Scottsdale; G. Robert Pankey, Fountain Hills, both of Ariz.

[73] Assignee: Conagra, Inc., Omaha, Nebr.

[21] Appl. No.: 17,774

[22] Filed: Feb. 20, 1987

[51] Int. Cl.⁴ .................. A47J 37/04; A47J 39/00
[52] U.S. Cl. ................................. 99/483; 99/341; 99/419; 99/467
[58] Field of Search ............ 99/483, 341, 419, 421 R, 99/421 H, 421 HH, 421 HV, 421 TP, 467, 473-479; D7/323, 347, 348; 312/236

[56] References Cited

U.S. PATENT DOCUMENTS

| | | | |
|---|---|---|---|
| Re. 23,662 | 5/1953 | Larkin | 99/421 H |
| 2,552,621 | 5/1951 | Clay | 99/421 V |
| 2,618,563 | 11/1952 | Barnhard | 99/419 |
| 2,710,575 | 6/1955 | Overman | 99/421 H |
| 2,859,685 | 11/1958 | Alexander | 99/419 |
| 3,273,489 | 9/1966 | Wilson | 99/483 X |
| 3,316,010 | 4/1967 | Lowrance | 99/419 |
| 3,956,979 | 5/1976 | Coroneos | 99/421 V |
| 3,999,475 | 12/1976 | Roderick | 99/474 |

*Primary Examiner*—Timothy F. Simone
*Attorney, Agent, or Firm*—Willian Brinks Olds Hofer Gilson & Lione Ltd.

[57] ABSTRACT

An apparatus is described which is adapted to simultaneously heat and display a plurality of food products each on a stick, such as corn dogs. The apparatus includes a cabinet with side wall means that are at least partially transparent so as to allow operators and customers to readily see within the cabinet. The apparatus also includes a shaft which is rotatably mounted within the cabinet. Associated with the shaft means is a plurality of stick retaining means which serve to releasably retain the sticks of the food products on the shaft. Rotating means are provided for rotating the shaft within the cabinet. The apparatus further includes heating means for maintaining the food products at the serving temperature desired.

10 Claims, 2 Drawing Sheets

FIG. 4
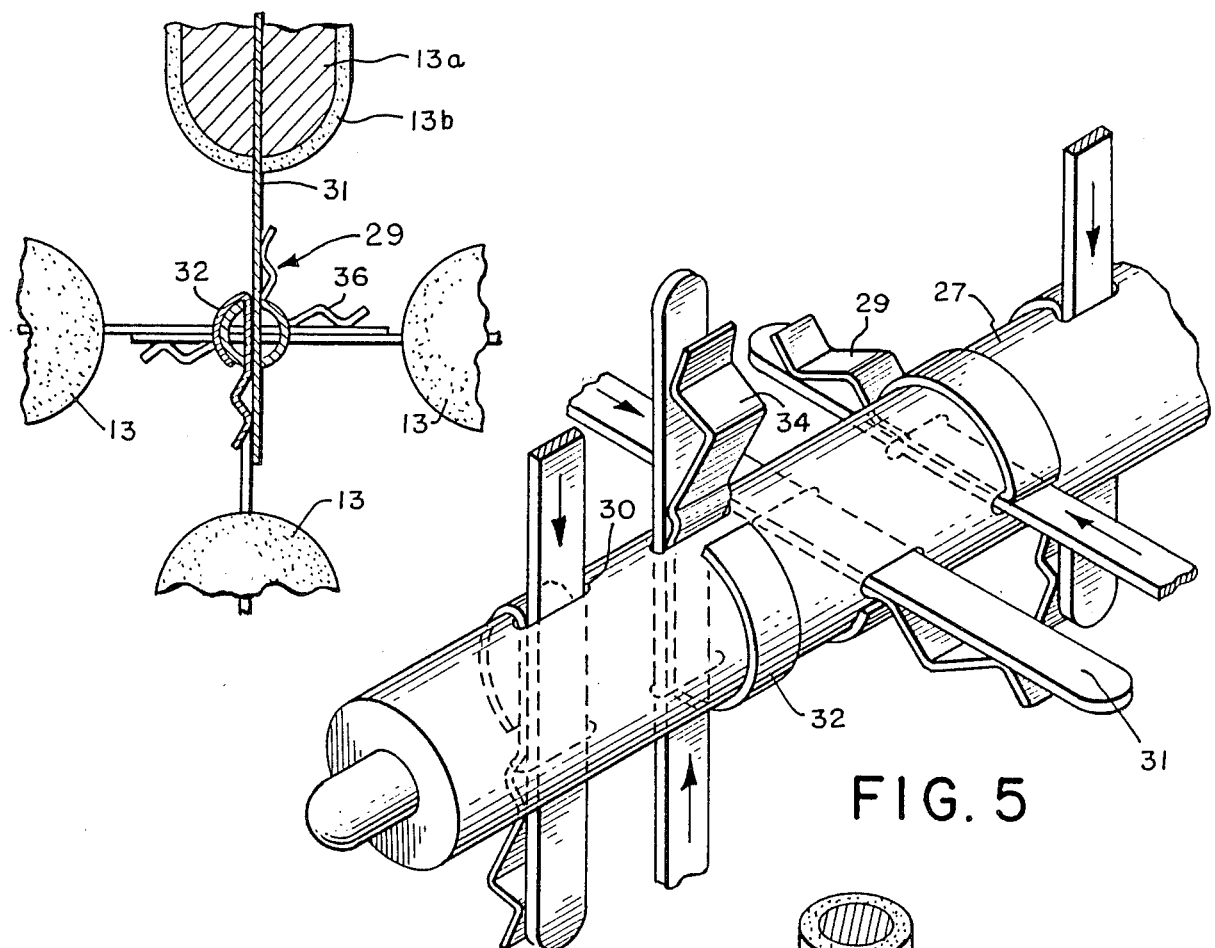
FIG. 5
FIG. 7
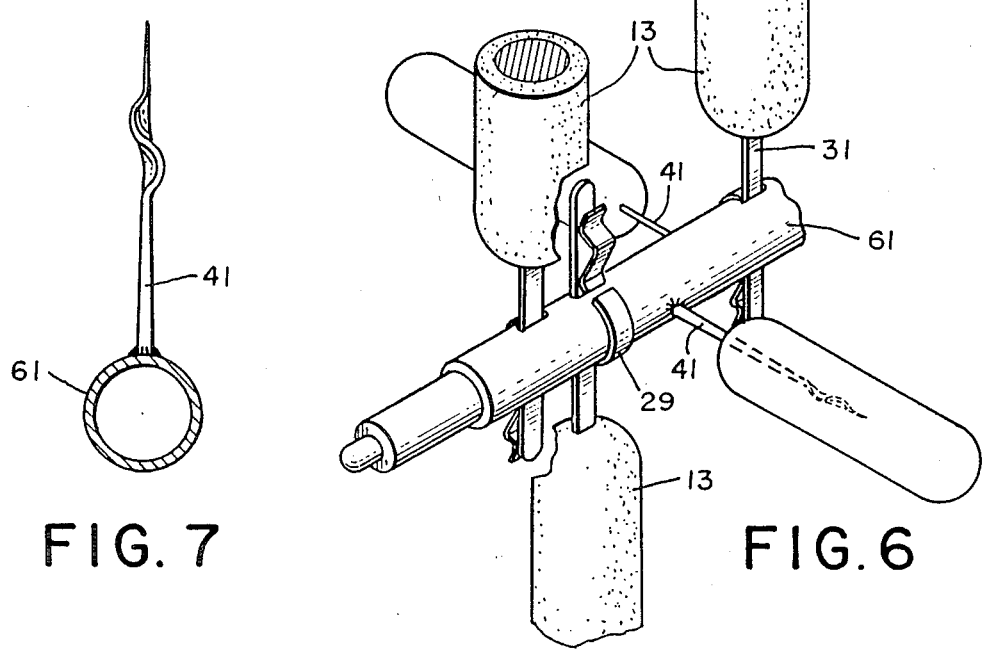
FIG. 6

APPARATUS FOR HEATING AND DISPLAYING FOOD PRODUCTS ON A STICK

BACKGROUND OF THE INVENTION

The present invention relates to the field of food heating and display apparatus. More particularly, the invention relates to an apparatus adapted to simultaneously heat and display food products which are produced and sold on sticks.

One of the advantages of providing food products on a stick is that they can thus be dispensed to the consumer without providing a container or wrapper. In addition, they can be eaten by the consumer without utensils and without getting messy fingers.

An example of a food product on a stick is the corn dog. The corn dog is a popular food product which consists of a hot dog, or similar wiener or sausage type product, which has been impaled on a stick, dipped in a corn meal based batter and then deep fat fried. Typically, corn dogs are sold by establishments which are equipped with a deep fat frier. Such establishments can either buy regular hot dogs and then dip them in their own batter just prior to frying, or they can buy pre-dipped corn dogs which are usually frozen.

Alternatively, establishments which are not equipped with a deep fat fryer can offer corn dogs on their menu by purchasing corn dogs which have already been deep fat fried by the food manufacturer and then frozen for shipment. Such pre-fried corn dogs can be prepared for consumption by heating them to the desired serving temperature in a microwave or conventional oven.

Another example of a wiener type product, which is sometimes referred to as a "pig in a blanket," consists of a hot dog which is encased in a bread or biscuit dough and then cooked, either by deep fat frying or in an oven. Yet another example of a food product that is amenable to being served on a stick is the shish kebob, i.e. pieces of meat with vegetables and/or fruit which are cooked together on a skewer.

SUMMARY OF THE INVENTION

In general, the present invention is an apparatus designed to simultaneously heat and display a plurality of food products each on a stick. The apparatus includes a cabinet means which has top, bottom, and side wall means. At least a portion, and preferably all, of said side wall means is transparent so as to allow operators and customers to readily see within the cabinet means. The apparatus also includes shaft means which is rotatably mounted within the cabinet means. Associated with the shaft means is a plurality of stick retaining means which serve to releasably retain the sticks of the food products on the shaft. Rotating means is provided for rotating the shaft means within the cabinet. The apparatus further includes heating means for maintaining the food products at the serving temperature desired.

In accordance with one preferred embodiment of the invention, the cabinet is a generally rectangular box with side walls made of glass. The rotating shaft includes holes passing therethrough. Spring clips are provided to bias against a portion of the stick which is inserted into the holes to thereby releasably retain the sticks within the holes.

In accordance with another preferred embodiment, the shaft also includes a plurality of radially extending skewers upon which hot dogs can be impaled. As a result, corn dogs and the like can be heated and displayed together with regular hot dogs, i.e. without sticks, in the same apparatus.

An advantage of the present invention is the fact that it provides an efficient means for heating and displaying various food products which are produced and sold on a stick. In particular, the operator can place food products in the apparatus with relative ease and without having to use any utensils or containers, and without touching the food product with his fingers. Likewise, the product can be removed from the apparatus without difficulty, utensils, or mess.

In addition, the apparatus is designed to bring the food products up to the proper serving temperature and then hold them at that temperature until they are dispensed for consumption, all the while displaying the products to potential customers. As a result, the customer who chooses to purchase one of the products can be served immediately. This is particularly important in light of the trend for convenience stores to offer hot food products to their customers. In these applications it is important that the food products be available for immediate consumption. The apparatus is also advantageous for applications where self service is desired. That is, in establishments such as convenience stores or cafeterias, the apparatus is well suited for the customer to select the food product and easily remove the product from the apparatus.

BRIEF DESCRIPTION OF THE DRAWINGS

The present invention will be more clearly understood from the following detailed description of the specific embodiments, read in conjunction with the accompanying drawings, wherein:

FIG. 4 is a cross-sectional view taken along line 4—4 of FIG. 2;

FIG. 5 is an enlarged view of the shaft means of the apparatus of FIG. 1;

FIG. 6 is a view similar to FIG. 5 of an apparatus for heating and displaying corn dogs and hot dogs made according to an alternatively preferred embodiment of the present invention;

FIG. 7 is a cross-sectional view taken along line 7—7 of FIG. 6.

DETAILED DESCRIPTION

Figure 1:
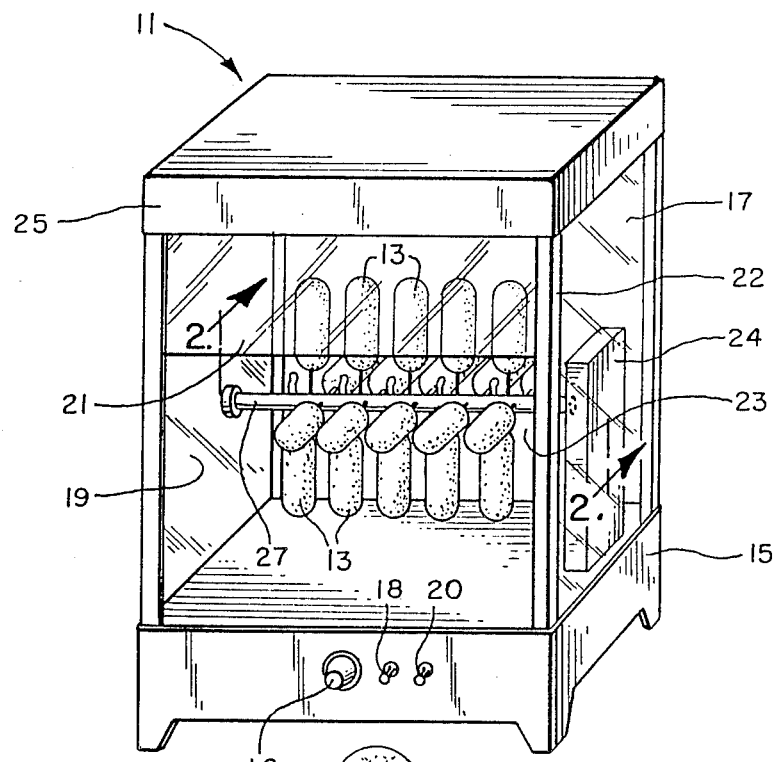
FIG. 1 is a front perspective view of a food product heating and display apparatus made according to a preferred embodiment of the present invention.
Figure 2:
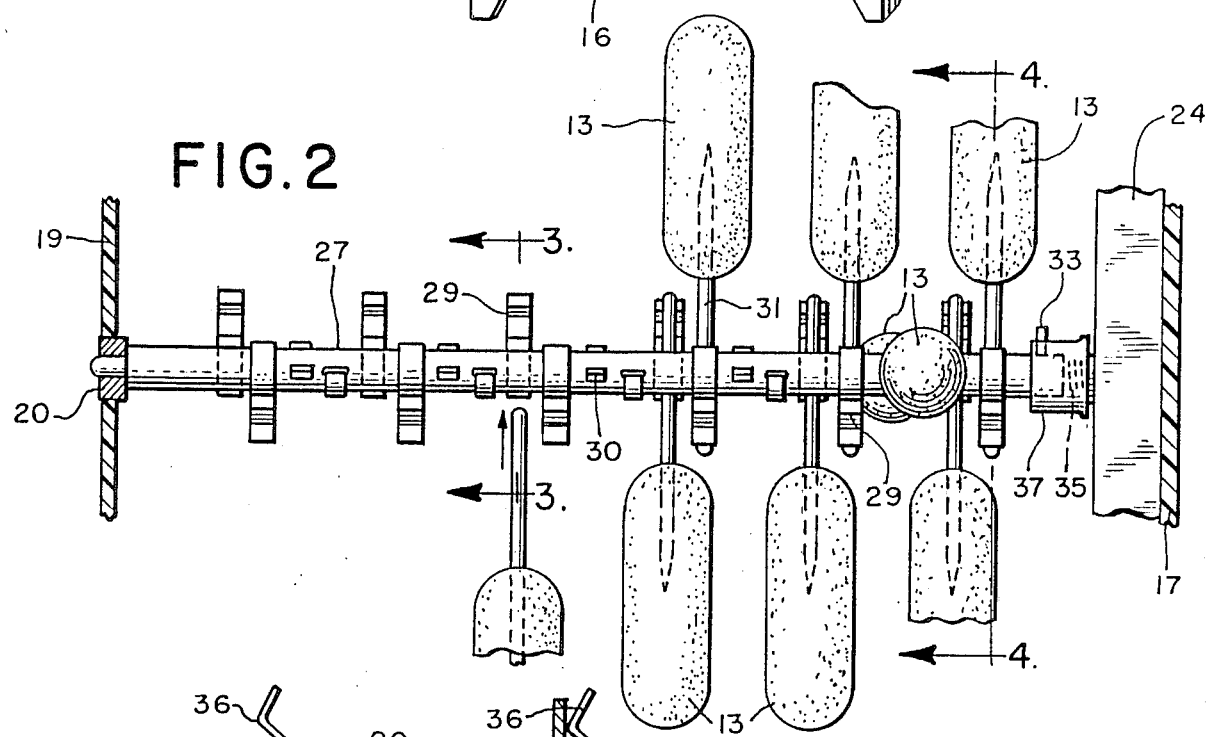
FIG. 2 is a cross-sectional view taken along line 2—2 of FIG. 1.

Referring to the drawings, FIG. 1 shows an apparatus 11 for simultaneously heating and displaying a plurality of food products 13 which apparatus is made according to a preferred embodiment of the present invention.

It is noted that the apparatus of this preferred embodiment is similar to that which is commercially available for the heating and displaying of hot dogs, i.e. one in which hot dogs are impaled on radially arranged skewers attached to a rotating horizontal shaft in a heated transparent cabinet. As a result, the depicted embodiment can be provided by taking this type of hot dog device and modifying it to accommodate a plurality of corn dogs 13. This modification is accomplished by removing the rotating shaft having radial skewers, and installing a rotating shaft which has stick retaining means associated therewith.

Specifically, the hot dog apparatus which is modified according to the preferred embodiment is sold by the Glen Ray Co. under the designation "Hot Dog Machine, Model 56." As mentioned above, this machine is modified by replacing the original shaft with the shaft of the present invention having stick retaining means. Thus, while the details of the original hot dog machine form no part of the present invention, the following description of the components of the machine after it is modified is provided by way of explanation of the most preferred embodiment.

The apparatus 11 includes a base portion 15, a top portion 25 and four glass side walls 17, 19, 21, and 23. The top portion and side walls are supported by corner posts 22. The front side wall 19 extends only about one fourth the way from the top to the bottom, i.e. the front three fourths of the cabinet is open.

A horizontal rotating shaft 27 is journaled within the side wall 19 and affixed to a driving unit 24. As will be described in more detail below, the shaft 27 includes a plurality of stick retaining means which are used to retain a plurality of food products 13 on the shaft.

Preferably, the food products on sticks are coated wiener type products, most preferably corn dogs 13 as shown in this figure. An example of a suitable corn dog is the pre-fried frozen corn dogs sold by the Armour Food Co.

Alternatively, the food products can comprise other forms of meat, dairy, fruit, or vegetable products which are served hot and which are suited to be served and eaten on a stick. For example, in other embodiments the food product is a shish kebob comprising meat cubes and pieces of vegetable skewered on a stick.

The term "stick," as used herein and in the appended claims, is intended to be given a relatively broad interpretation and to refer to sticks that are formed from wood, rolled paper, plastic, or the like.

The food product used in the present invention should generally be cooked before it is placed in the apparatus. For example, the corn dogs 13 in the most preferred embodiment are coated and fried by the food manufacturer and then frozen for shipment to the food service establishment. The establishment can either put the corn dogs directly into the apparatus for thawing and heating, or can thaw them in a microwave or conventional oven, or by leaving them in a refrigerated case before putting them in the apparatus. For convenience, it is preferred to put the frozen corn dogs directly into the apparatus. It has been observed that corn dogs can be brought from about 0° to the recommended serving temperature of about 140° in about 45 minutes. Accordingly, when it is desired to reduce the preparation time, it is preferred to thaw the corn dogs first.

The apparatus 11 includes a heating means (not shown) disposed within the top portion 25. In this most preferred embodiment, the heating means is two quartz heating elements. These elements are controlled by the switch 16 which is located on the bottom portion 15 and can thereby be set for low, medium, or high heat depending on the desired temperature for the cabinet. The heating means of the invention should be capable of at least maintaining the food products 13 at the desired serving temperature. As noted above, the heating means is also preferably used to thaw the food products and to bring them to the serving temperature.

The minimum serving temperature should typically be at least 140° F. to comply with government regulations. Because the apparatus is intended to hold the food products at this temperature for a relatively long period, it is generally preferred to keep the temperature close to this minimum, i.e. to avoid overdrying of the products.

A rotating means is provided for rotating the shaft 27 about its longitudinal axis. In the embodiment depicted, this rotation is caused by a motor (not shown) located inside the box 24 which motor is connected by a set of gears to the shaft 27. The motor and gears in this embodiment are designed so that the shaft is rotated through about 3 and one-half rotations per minute. The motor can be turned on and off by the toggle switch 20 located on the front of the bottom portion 15. Naturally, it is preferred to turn the motor off when inserting the stick in the shaft. The rotation of the shaft during operation not only helps obtain an even heating of the products but is also advantageous because the movement of the food products is believed to make the products more visible to the customers.

In this most preferred embodiment, the apparatus 11 also includes a light source in the top portion 25. In particular, two 40 watt light bulbs serve to illuminate the contents of the cabinet thereby improving the effectiveness of the apparatus in displaying the food products. A toggle switch 18 is provided to turn the light on and off. In addition, the side walls or the top portion can include marketing indicia with regard to the products and particularly their prices.

Figures 3, 3A:
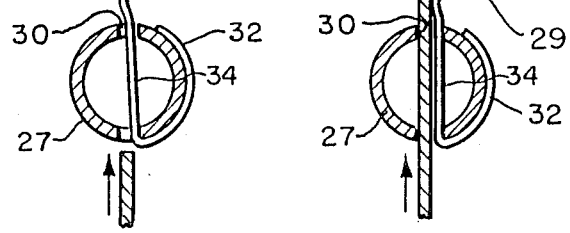
FIGS. 3 and 3a are cross-sectional views taken along line 3—3 of FIG. 2 illustrating the stick retaining means of the embodiment shown in FIG. 1.

Referring to FIGS. 2-5, a more detailed description of the preferred shaft means will be given. The shaft 27 is hollow and is provided with generally oval-shaped holes 30. Associated with each hole 30 is a spring clip 29. As shown in FIGS. 3 and 4, each of the spring clips is shaped so as to have one end 32 wrap around about one half of the shaft 27, have a portion 34 which passes through the hole 30, and then have an extending portion 36 which extends out of the hole 30. As seen in FIG. 3a, the spring clip is shaped so that the extending portion 36 biases against a portion of the stick 31 which is inserted through the hole 30. The spring clip should be shaped so as to provide sufficient frictional force to retain the stick within the hole, but not so much as to make removal of the stick difficult.

When producing an apparatus according to the present invention by modifying an existing hot dog machine, the shaft 27 should be designed to fit within the cabinet and be attached to the rotating means in a fashion similar to the original shaft from the hot dog machine. In the embodiment depicted, the shaft 27 is journaled within a plastic sleeve in one side wall of the cabinet and is attached to the driving means as follows. A pin 33 is inserted through the shaft 27. A coil type spring 35 is inserted into the shaft so as to abut the pin 33 and extend out the end of the shaft. The driving means includes a cup 37 into which the end of the shaft fits. As the shaft is pushed into the cup 37, the pin slides into a J-shaped slot configured in such a way so that, after the shaft is pushed in and then twisted, the pin is pushed back by the spring against the end of the slot which does not pass to the end of the cup. As a result, the shaft is held firmly in place during operation, but can be easily removed for cleaning.

FIGS. 4 and 5 best show the preferred arrangement of the stick retaining means on the shaft 27. In this arrangement, the holes are provided in repeating pairs set at right angles. Clips 29 are then put in these pairs of holes so that the extending portion 36 of one clip faces in one direction and the extending portion of the second clip faces in the opposite direction.

An alternatively preferred embodiment is illustrated in FIGS. 6 and 7. This embodiment is designed to be capable of heating and displaying food products on sticks simultaneously with conventional wiener type products, i.e. without sticks. Most preferably, this apparatus is used for corn dogs and hot dogs. As shown, this is accomplished by providing a shaft 61 which includes both stick retaining means for corn dogs and the like, and skewers 41 for hot dogs. Naturally, this alternative embodiment is preferred for use by establishments with a sales volume too low to support two machines.

Another alternative which will allow an establishment to use a single apparatus to heat and display both hot dogs and food products on sticks is to use a shaft such as that shown in FIGS. 1-5, i.e. no skewers, and then to provide the establishment with a supply of extra sticks. In this way, hot dogs can be put on the sticks and thereby heated and displayed in the same apparatus with corn dogs and the like.

It should be noted that although much of the discussion has involved the use of corn dogs in the apparatus of the present invention, other heated food products which can be sold on a stick are also suitable for use in the apparatus. In addition, although a specific embodiment has been described, i.e. where an existing hot dog machine was modified according to the invention, variations of this embodiment are clearly possible. For example, other forms of stick retaining means are available for use. Also, the rotating shaft can be set within the cabinet vertically instead of horizontally. Certainly, these and all other modifications which are within the ordinary skill in the art to make are considered to lie within the scope of the invention as defined by the following claims.

What is claimed is:

1. An apparatus for simultaneously heating and displaying a plurality of corn dogs each on a disposable stick, said apparatus comprising:
    cabinet means including top, bottom, and side wall means, at least a portion of said side wall means being transparent so as to allow operators and customers to see within the cabinet means;
    shaft means rotatably mounted within the cabinet means and including a plurality of stick retaining means on said shaft for releasably retaining the disposable sticks of the food products thereon;
    rotating means for rotating the shaft means; and
    heating means for maintaining said food products at a desired serving temperature.

2. The apparatus of claim 1 wherein each stick retaining means comprises a hole through the shaft means and a spring means adapted to bias against a portion of a stick which is inserted into the hole to thereby releasably retain the stick within the hole.

3. The apparatus of claim 1 wherein the shaft means further comprises a plurality of skewer means upon which hot dogs can be impaled and thereby heated and displayed together with the food products on sticks.

4. The apparatus of claim 2 wherein the shaft means further comprises a plurality of skewer means upon which hot dogs can be impaled and thereby heated and displayed together with the food products on sticks.

5. The apparatus of claim 1 wherein the food products are corn dogs.

6. The apparatus of claim 2 wherein the food products are corn dogs.

7. An apparatus for simultaneous heating and displaying a plurality of food products each on a stick, said apparatus comprising:
    cabinet means including top, bottom, and at least three generally rectangular side wall means, at least two of said side wall means being transparent so as to allow operators and customers to see within the cabinet means;
    shaft means rotatably mounted within the cabinet means and including a plurality of holes each hole having a spring clip cooperating therewith to releasably retain a stick of the food product within the hole;
    rotating means for rotating the shaft means; and
    heating means for maintaining the food products at a desired serving temperature.

8. The apparatus of claim 7 wherein the food products are corn dogs.

9. An apparatus for simultaneous heating and displaying a plurality of food products each on a stick together with hot dogs, said apparatus comprising:
    cabinet means including top, bottom, and at least three generally rectangular side wall means, at least two of said side wall means being transparent so as to allow operators and customers to see within the cabinet means;
    shaft means rotatably mounted within the cabinet means and including a plurality of holes each hole having a spring clip cooperating therewith to releasably retain a stick of a food product within the hole, and further including a plurality of skewer means upon which the hot dogs can be impaled and thereby heated and displayed together with the food products on sticks;
    rotating means for rotating the shaft means; and
    heating means for maintaining said food products and hot dogs at a desired serving temperature.

10. The apparatus of claim 9 wherein the food type products are corn dogs.

* * * * *